United States Patent
Debrito (10) Patent No.: US 7,221,811 B2
(45) Date of Patent: May 22, 2007

(54) METHOD AND APPARATUS FOR CONVEYING IMAGE ATTRIBUTES

(75) Inventor: Daniel N Debrito, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 701 days.

(21) Appl. No.: 10/677,194

(22) Filed: Oct. 1, 2003

(65) Prior Publication Data

US 2005/0074170 A1   Apr. 7, 2005

(51) Int. Cl.
G06K 9/32 (2006.01)
H04N 5/76 (2006.01)

(52) U.S. Cl. .................................. 382/297; 348/231.6

(58) Field of Classification Search ................ 382/232, 382/305, 296, 297, 276; 348/208.1, 208.2, 348/231.3, 231.6; 345/656, 659; 396/50, 396/53, 311
See application file for complete search history.

(56) References Cited

U.S. PATENT DOCUMENTS

| | | | |
|---|---|---|---|
| 5,900,909 A * | 5/1999 | Parulski et al. .......... | 348/231.6 |
| 6,148,149 A * | 11/2000 | Kagle ........................... | 396/50 |
| 6,198,526 B1 * | 3/2001 | Ohtsuka ....................... | 355/40 |
| 6,222,584 B1 * | 4/2001 | Pan ........................... | 348/231.6 |
| 6,747,690 B2 * | 6/2004 | Mølgaard ................. | 348/208.1 |
| 6,747,693 B1 * | 6/2004 | Yamashita et al. ........ | 348/222.1 |
| 6,762,791 B1 * | 7/2004 | Schuetzle ................ | 348/231.3 |
| 6,819,362 B2 * | 11/2004 | Hsu ........................... | 348/374 |
| 6,834,126 B1 * | 12/2004 | Henry et al. ................. | 382/276 |
| 6,937,356 B1 * | 8/2005 | Ito et al. ..................... | 358/1.16 |
| 7,110,026 B2 * | 9/2006 | Feldis, III ................ | 348/231.6 |

FOREIGN PATENT DOCUMENTS

| | | | |
|---|---|---|---|
| JP | 05-183674 A | 7/1993 |
| JP | 2002-152568 A | 5/2002 |
| JP | 2002-358714 A | 12/2002 |
| JP | 2003-274366 A | 9/2003 |

\* cited by examiner

Primary Examiner—Samir Ahmed
Assistant Examiner—Jeffrey Smith

(57) ABSTRACT

Attributes of a digital image are conveyed using the case of letters in an extension of a file name associated with the digital image. The technique is applicable to a wide variety of image attributes, including orientation.

19 Claims, 8 Drawing Sheets

FIG. 1A image.jpg
image.jpG
image.jPg
image.jPG
image.Jpg
image.JpG
image.JPg
image.JPG

METHOD AND APPARATUS FOR CONVEYING IMAGE ATTRIBUTES

FIELD OF THE INVENTION

The present invention relates generally to digital imaging and more specifically to techniques for conveying attributes of digital images in digital imaging devices and image display systems.

BACKGROUND OF THE INVENTION

Computer programs that display digital images often display them incorrectly because the programs do not take into account important attributes of the digital images. For example, such programs often display digital images in the wrong orientation. A rotated image results when the user of a digital imaging device rotates the device 90 degrees clockwise or counterclockwise from the standard landscape orientation during image capture. Displaying a rotated image in the correct orientation using image display software requires manual intervention by the user. Manual compensation becomes particularly burdensome for large numbers of images.

It is thus apparent that there is a need in the art for an improved method and system for conveying image attributes.

SUMMARY OF THE INVENTION

A method for conveying an attribute of a digital image is provided. A method for displaying a digital image in accordance with an attribute of the digital image is also provided. A digital imaging device, a system, and a computer-readable storage medium are also provided for carrying out the methods.

Other aspects and advantages of the present invention will become apparent from the following detailed description, taken in conjunction with the accompanying drawings, illustrating by way of example the principles of the invention.

DETAILED DESCRIPTION OF THE INVENTION

Attributes of a digital image may be conveyed by encoding them using the case of letters in an extension of a file name associated with the digital image. Throughout this description, the "case" of a letter refers to any distinct manner in which that letter can be represented. The most common examples are upper case (capitalization) and lower case. However, the concept of case, in an electronic system such as a digital imaging device or a computing device, may be generalized to include other representations such as reverse video and blinking video, each of which may be combined with upper or lower case. Analogously, groups of words may be rendered in a variety of different cases such as upper case, lower case, title case, or sentence case.

Figure 1A:
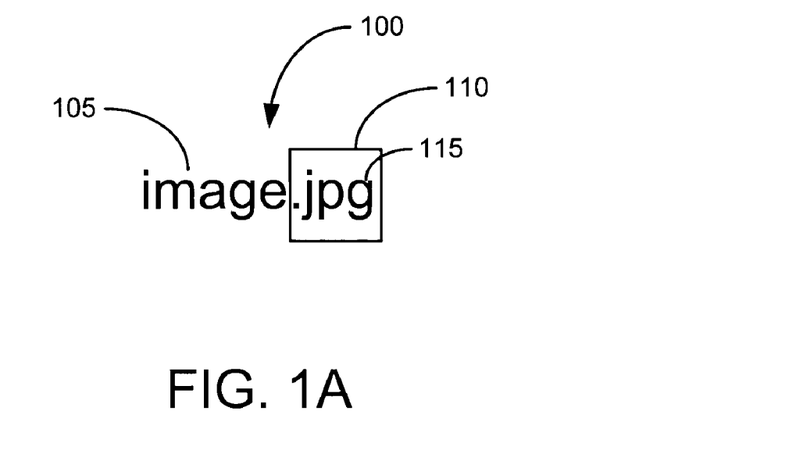
FIG. 1A is an illustration of a file name associated with a digital image in accordance with an illustrative embodiment of the invention.

FIG. 1A is an illustration of a file name 100 associated with a digital image in accordance with an illustrative embodiment of the invention. File name 100 comprises root portion 105 ("image") and extension 110 (".jpg"). Most computer operating systems define an extension 110 of a file name 100 as a suffix of root portion 105 comprising a period followed by one or more alphanumeric characters. In the example of FIG. 1A, extension 110 contains three letters 115 ("jpg") corresponding to the Joint Photographic Experts Group (JPEG) image compression format. Other common image-file extensions are ".gif" (Graphic Interchange Format) and ".tif" (Tag Image File Format). Depending on the computer operating system, extension 110 may have more or fewer than three letters 115.

Figure 1B:
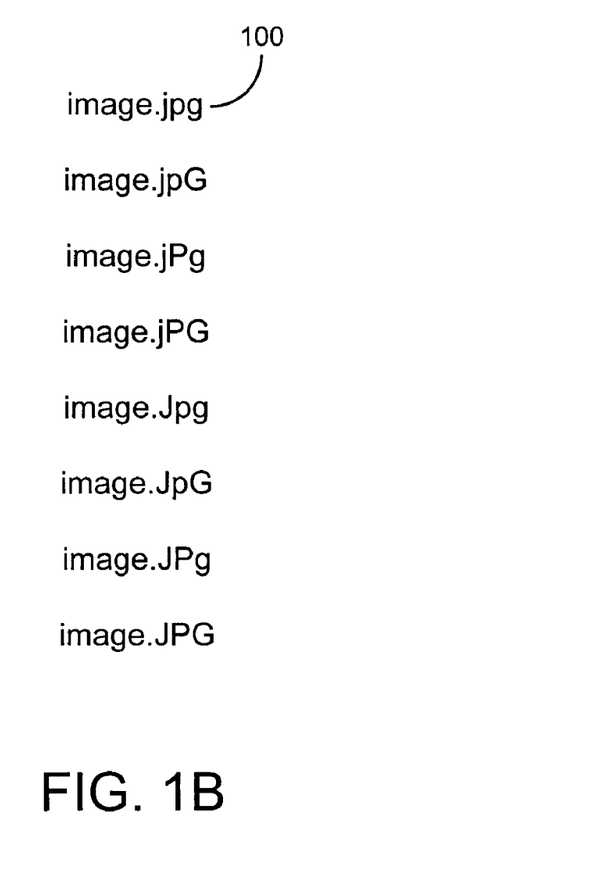
FIG. 1B is an illustration showing how the case of the letters in the extension of a file name may be used to convey image attributes in accordance with an illustrative embodiment of the invention.

FIG. 1B is an illustration showing how the case of the letters in extension 110 may be used to convey image attributes in accordance with an illustrative embodiment of the invention. Each of the eight file names shown in FIG. 1B has a different combination of capitalization among the letters 115 in extension 110. In general, if each letter 115 may be represented in one of two cases, an N-letter extension 110 may be used to encode $2^N$ unique combinations. Each of these unique combinations (or a predetermined subset thereof) may be mapped to an attribute of the associated digital image. Examples of attributes include image orientation, color vs. black-and-white, color depth, double exposure, special effects present in the image, the location where the image was captured, and the device with which the image was captured. In general, an attribute is any characteristic of the digital image. Although the remainder of this description focuses on the attribute of image orientation, the principles of the invention may be applied to any other attribute of a digital image.

Figure 2:
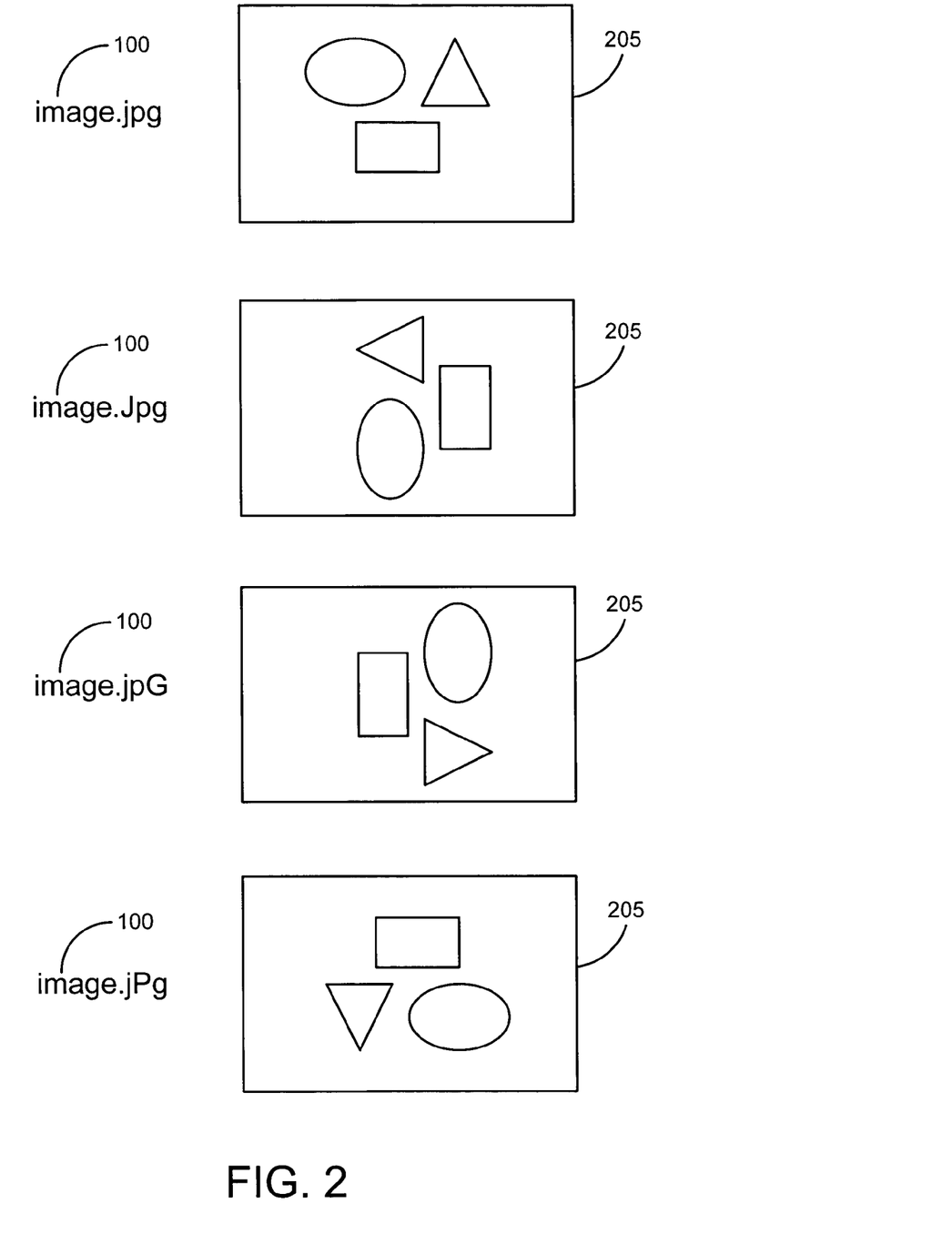
FIG. 2 is an illustration showing an example of how specific case combinations in the extension of a file name may be used to convey the orientation of an associated digital image in accordance with an illustrative embodiment of the invention.

FIG. 2 is an illustration showing an example of how a set of case combinations in extension 110 may be used to convey the orientation of a digital image in accordance with an illustrative embodiment of the invention. In FIG. 2, each of four unique case combinations in extension 110 corresponds to a particular orientation of digital image 205. In this example, the extension 110 ".jpg" (all lower case) corresponds to a right-side-up landscape orientation (the reference orientation). The extension 110 ".Jpg" corresponds to an orientation in which digital image 205 is rotated counterclockwise by 90 degrees with respect to the reference orientation. The extension 110 ".jpG" corresponds to an orientation in which digital image 205 is rotated clockwise by 90 degrees with respect to the reference orientation. The extension 110 ".jPg" corresponds to an orientation in which digital image 205 is inverted with respect to the reference orientation. The particular mapping of case combinations to orientations shown in FIG. 2 is arbitrary and may be defined in a variety of other ways.

Those skilled in the art will recognize that an image that is rotated by 90 degrees in one sense or the other with respect to the reference orientation is produced when a digital imaging device is rotated by 90 degrees in the opposite sense during image capture. For example, a digital image 205 that is rotated by 90 degrees counterclockwise with respect to the reference orientation results when a digital imaging device is rotated by 90 degrees clockwise during image capture, and vice versa.

Figure 3A:
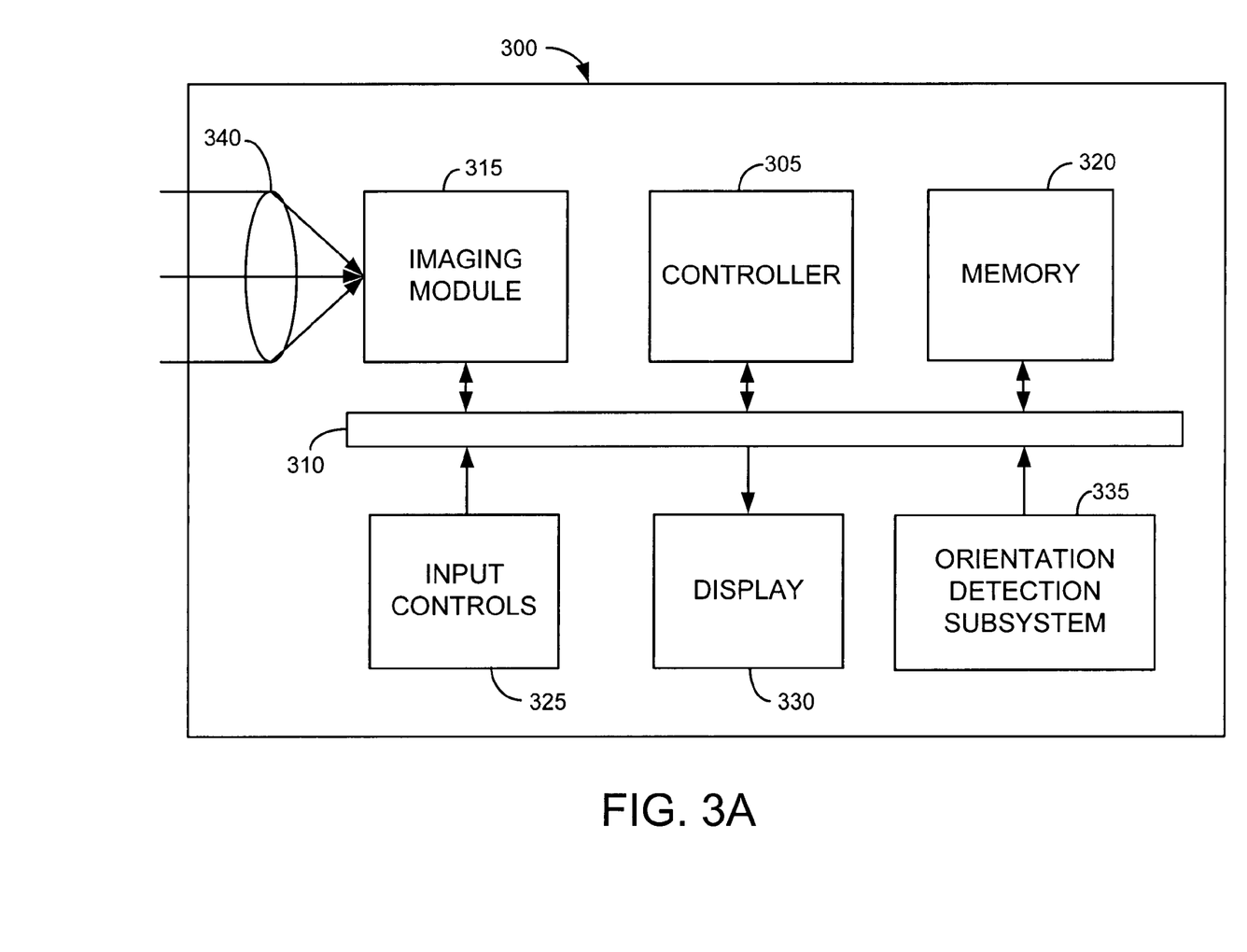
FIG. 3A is a functional block diagram of a digital imaging device in accordance with an illustrative embodiment of the invention.

FIG. 3A is a functional block diagram of a digital imaging device 300 in accordance with an illustrative embodiment of the invention. Digital imaging device 300 may be a digital camera, a digital camcorder, a personal digital assistance (PDA), or any other device capable of capturing digital images. In FIG. 3A, controller 305 communicates over data bus 310 with imaging module 315, memory 320, input controls 325, display 330, and orientation detection subsystem 335. Optical system 340 produces optical images that are converted to digital images by imaging module 315. Imaging module 315 may comprise an array of photosensors based on charge-coupled-device (CCD) or CMOS technology, an analog-to-digital converter (A/D), a gain control, and a digital signal processor (DSP) (not shown in FIG. 3A). Input controls 325 may include navigational buttons (e.g., directional-arrow buttons), a menu or "ok" button, a shutter release button, or other controls, physical or virtual, for controlling the operation of digital imaging device 300. Orientation detection subsystem 335 may detect the orientation of digital imaging device 300 during image capture. Such orientation detection or tilt detection subsystems are well known in the art. For example, orientation detection subsystem may be based on accelerometer technology. Orientation detection subsystem 335 may be configured to detect whether digital imaging device 300 is in the reference orientation (right-side-up landscape) during image capture or whether the device is rotated 90 degrees clockwise or counterclockwise with respect to the reference orientation.

Figure 3B:
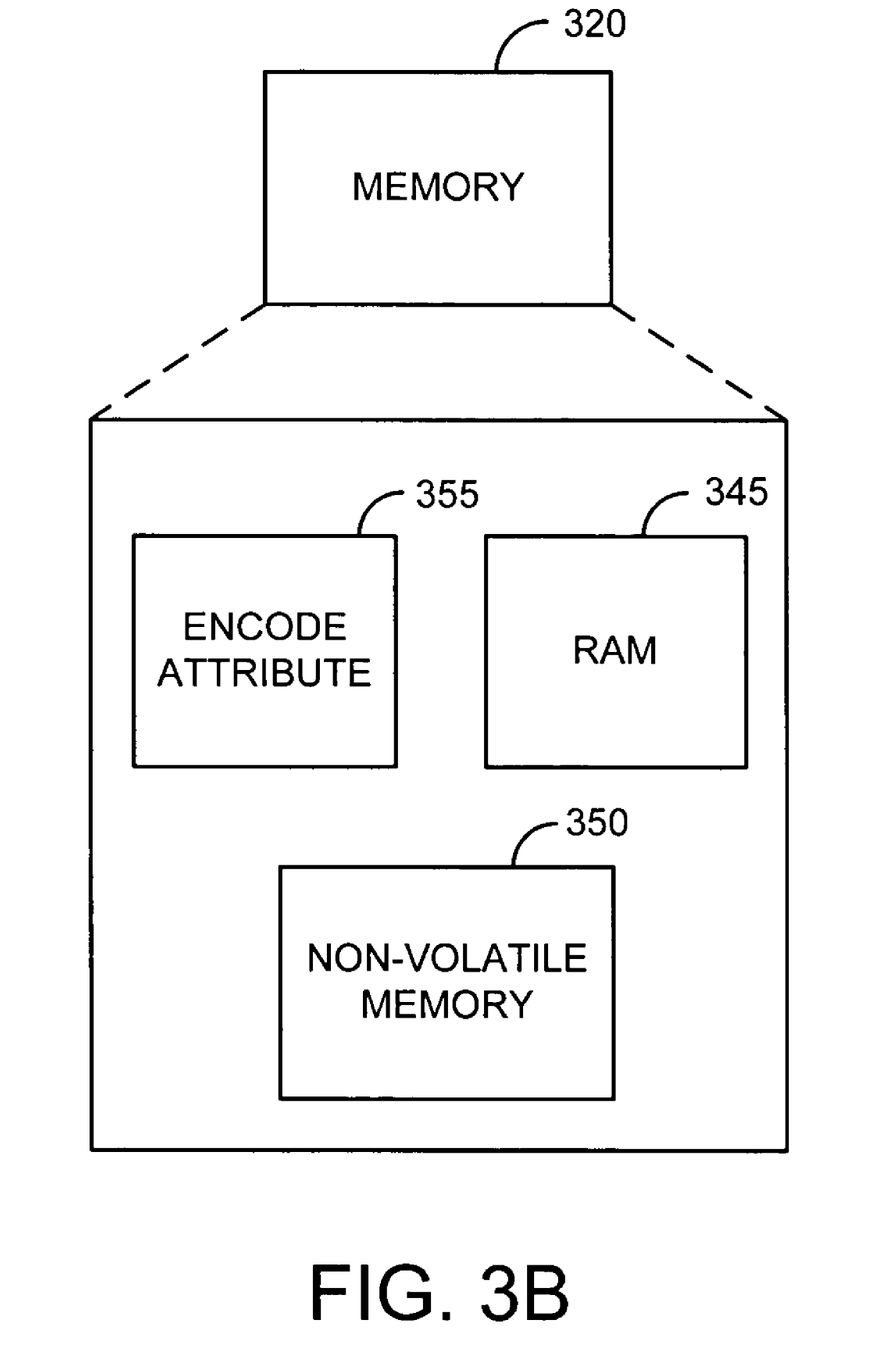
FIG. 3B is a conceptual diagram of a memory of the digital imaging device shown in FIG. 3A in accordance with an illustrative embodiment of the invention.

FIG. 3B is a high-level conceptual model of memory 320 in accordance with an illustrative embodiment of the invention. Memory 320 may further comprise both random access memory (RAM) 345 and non-volatile memory 350. Non-volatile memory 350 may, in some applications, be of the removable variety (e.g., a solid-state multi-media card). Functionally, memory 320 may also include, in RAM 345 and/or non-volatile memory 350, module encode attribute 355. Module encode attribute 355 comprises control logic to encode an attribute of a digital image 205 using the case of letters 115 in the extension 110 of a file name 100 associated with digital image 205, as explained in connection with FIGS. 1A, 1B, and 2. In one embodiment, module encode attributes 355 comprises stored program instructions in firmware that are executed by controller 305. In general, the functionality of module encode attributes 355 may be embodied in any combination of hardware, firmware, or software.

Figure 4:
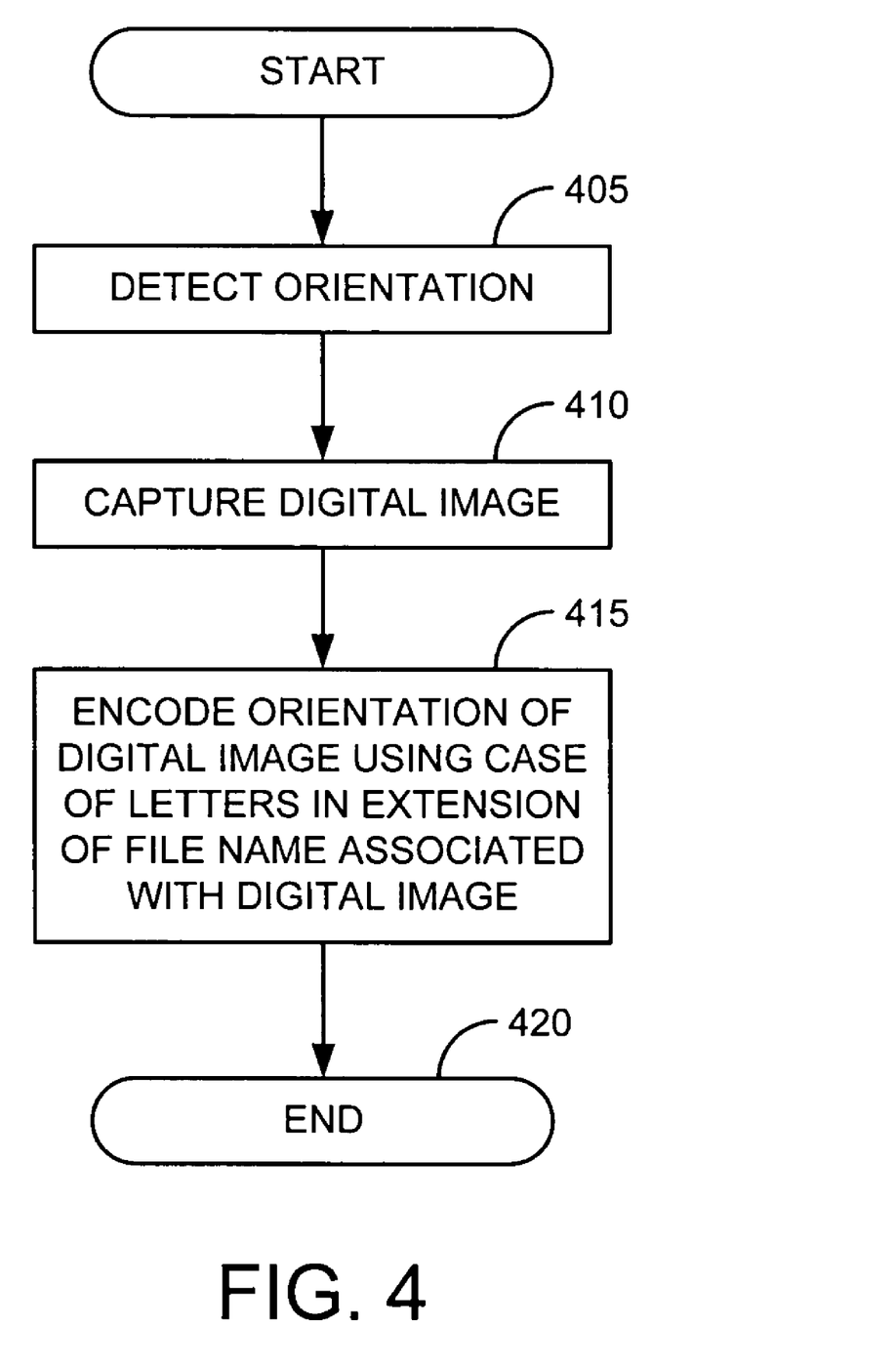
FIG. 4 is a flowchart of the operation of the digital imaging device shown in FIG. 3A in accordance with an illustrative embodiment of the invention.

FIG. 4 is a flowchart of the operation of digital imaging device 300 in accordance with an illustrative embodiment of the invention. At 405, orientation detection subsystem 335 detects the orientation of digital imaging device 300 relative to the reference orientation. At 410, digital imaging device 300 captures a digital image 205. At 415, module encode attributes 355 encodes the orientation of digital image 205 using the case of letters 115 in the extension 110 of a file name 100 associated with digital image 205. At 420, the process terminates.

As explained above, the sense of rotation of digital imaging device 300 during image capture is opposite that of the resulting rotation of digital image 205 when a rotated digital image 205 is produced. Therefore, encoding the orientation of digital image 205 at step 415 may be implemented in at least two ways: (1) to indicate the rotation of digital imaging device 300 during image capture or (2) to indicate the resulting rotation of digital image 205. As long as consistency is maintained with image display programs interpreting the encoded orientation in extension 110, either implementation is viable.

Figure 5:
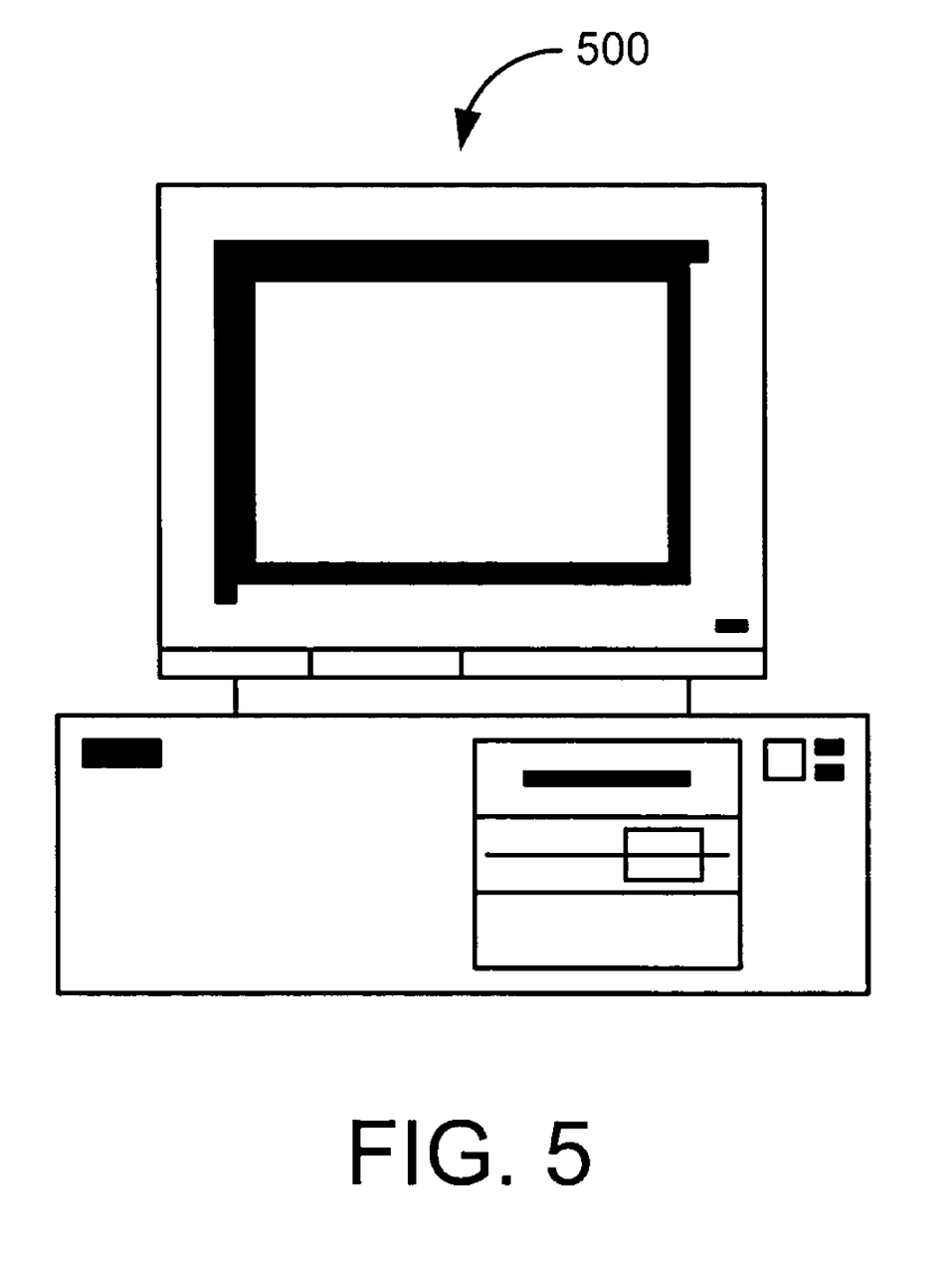
FIG. 5 is an illustration of an image display system in accordance with an illustrative embodiment of the invention.

FIG. 5 is an illustration of an image display system 500 in accordance with an illustrative embodiment of the invention. Image display system 500 may be a personal computer, laptop computer, notebook computer, PDA, smart phone, or any other device capable of displaying digital images. Image display system 500 may display a digital image 205 in accordance with attributes encoded using the case of letters 115 in the extension 110 of a file name 100 associated with the digital image 205.

Figure 6:
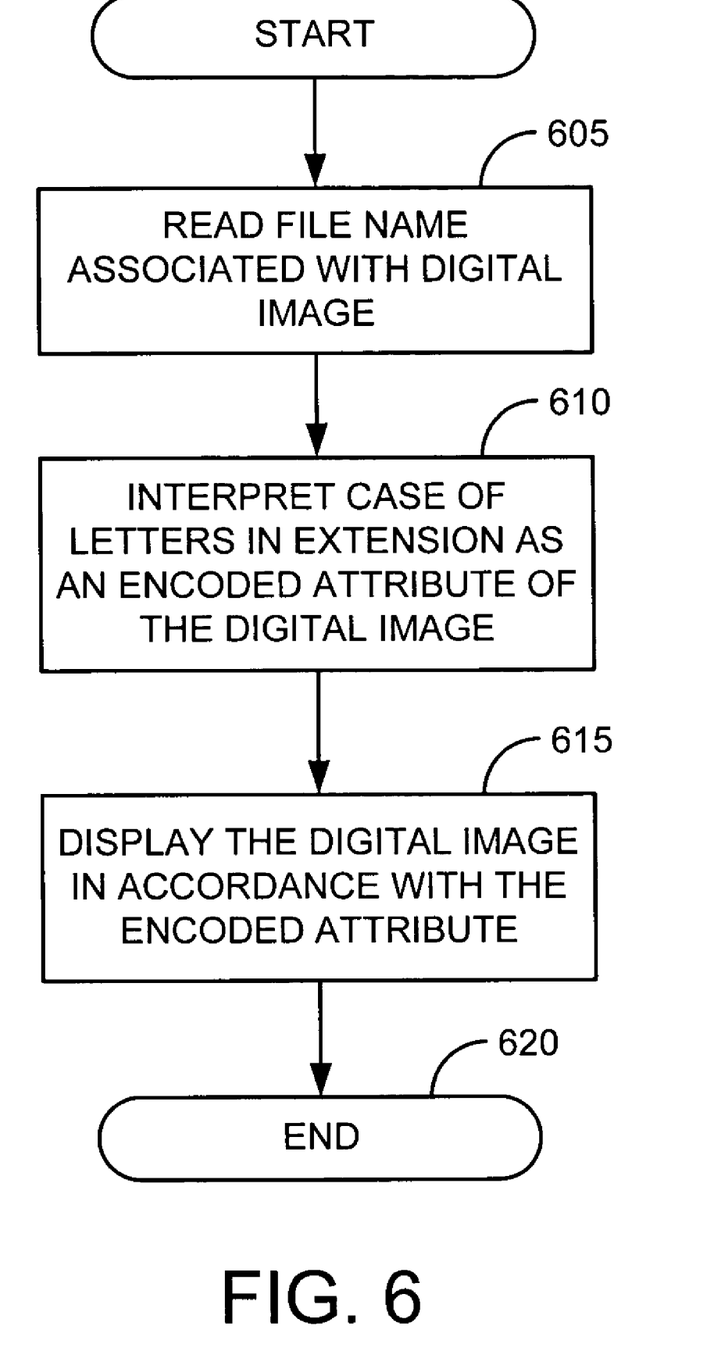
FIG. 6 is a flowchart of the operation of the image display system shown in FIG. 5 in accordance with an illustrative embodiment of the invention.

FIG. 6 is a flowchart of the operation of image display system 500 in accordance with an illustrative embodiment of the invention. At 605, image display system 500 reads a file name 100 associated with a digital image 205. The case of letters 115 in extension 110 of file name 100 is interpreted at 610 as an encoded attribute of digital image 205. At 615, image display system 500 displays digital image 205 in accordance with the encoded attribute. At 620, the process terminates.

One example of displaying digital image 205 in accordance with an encoded attribute is compensating for the rotation of digital image 205 in order to display the image in its correct orientation. For example, if digital image 205 has an associated file name 100 "image.Jpg" indicating that digital image 205 is rotated 90 degrees counterclockwise relative to the reference orientation (see FIG. 2), image display system 500 may compensate by rotating digital image 205 by 90 degrees in the clockwise sense to display digital image 205 right side up.

Figure 7:
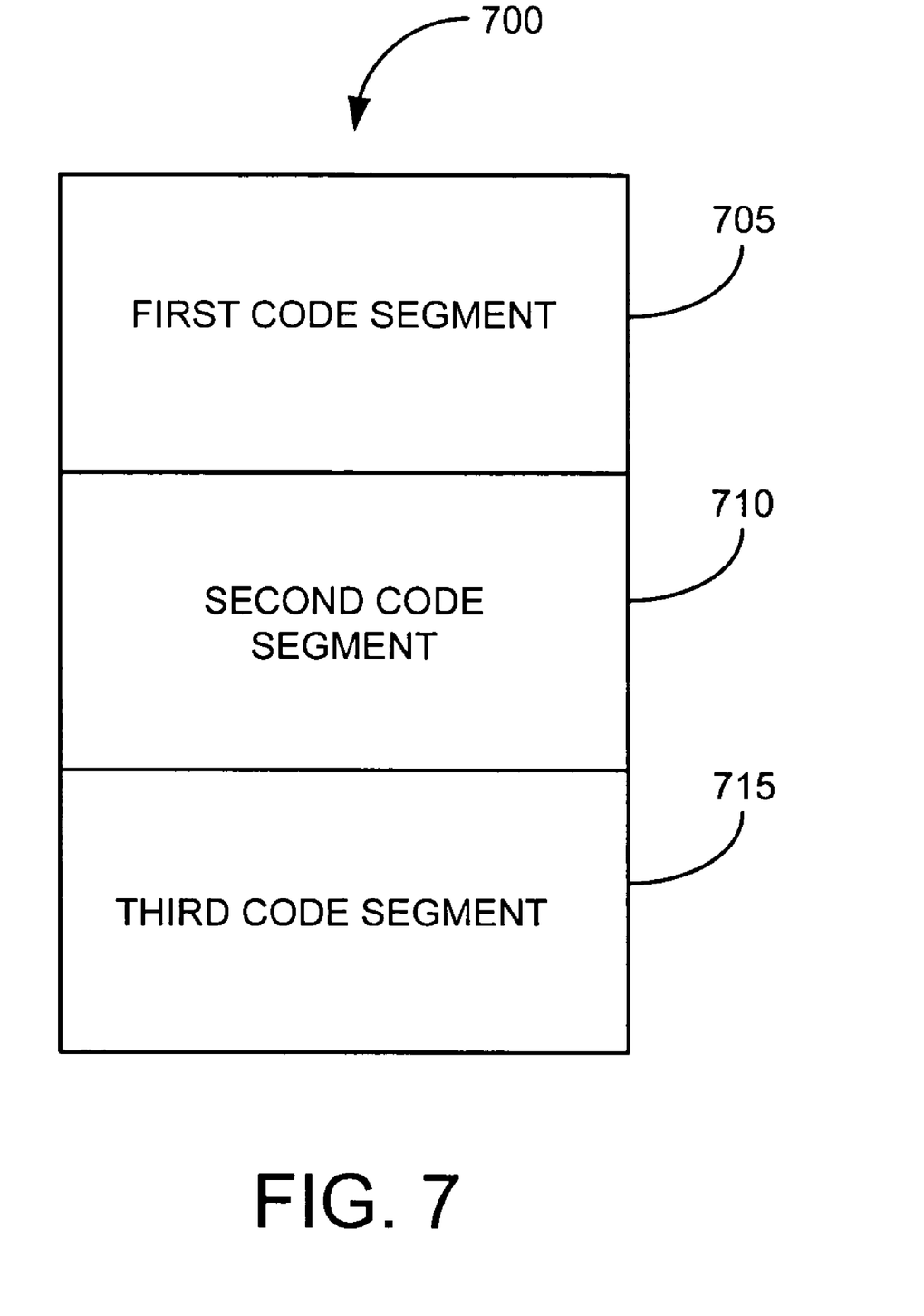
FIG. 7 is a conceptual diagram of a computer-readable storage medium in accordance with an illustrative embodiment of the invention.

FIG. 7 is a conceptual diagram of a computer-readable storage medium 700 containing program code in accordance with an illustrative embodiment of the invention. Computer-readable storage medium may be a magnetic disk, optical disc, floppy disk, tape, solid-state memory, or any other medium for storing electronic data and/or program instructions. Computer-readable storage medium 700 comprises three code segments. First code segment 705 reads a file name 100 associated with a digital image 205. File name 100 includes extension 110 comprising at least one letter 115. Each letter 115 in extension 110 may be represented in one of at least two possible cases. Second code segment 710 interprets the case (e.g., capitalization or lack thereof) of the letters 115 as an encoded attribute of digital image 205. Third code segment 715 causes digital image 205 to be displayed in accordance with the encoded attribute. In one embodiment, image display system 500 reads and executes the program code contained on computer-readable storage medium 700.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for conveying an attribute of a digital image, comprising encoding the attribute using the a case of letters in an extension of a file name associated with the digital image, wherein the case of each letter in the extension is one of upper case and lower case, and wherein the extension comprises N letters such that the case of the N letters is capable of representing 2N combinations.

2. The method of claim 1, wherein the encoded attribute is an orientation of the digital image.

3. The method of claim 2, wherein all the letters in the extension being in the same case indicates the digital image is right side up in landscape orientation.

4. The method of claim 2, wherein a leftmost letter in the extension being in a case different from that of one or more remaining letters in the extension indicates the digital image is rotated by 90 degrees in a first sense relative to a right-side-up landscape orientation and a rightmost letter in the extension being in a case different from that of the one or more remaining letters in the extension indicates the digital image is rotated by 90 degrees in a second sense opposite the first sense relative to a right-side-up landscape orientation.

5. The method of claim 4, wherein the first sense is counterclockwise and the second sense is clockwise.

6. The method of claim 2, wherein a central letter in the extension having a case different from the case of the one or more remaining letters in the extension indicates the digital image is inverted relative to a right-side-up landscape orientation.

7. The method of claim 1, further comprising detecting the orientation of the digital image when the digital image is captured by a digital imaging device end wherein the encoded attribute is an orientation of the digital image.

8. The method of claim 1, wherein the letters in the extension are one of "jpg," "gif," and "tif."

9. A method for displaying a digital image, comprising:
reading a file name associated with the digital image, the file name including an extension, the extension comprising at least one letter, each of the at least one letters being represented in one of at least two possible cases;
interpreting the case of the at least one letters as an encoded attribute of the digital image; and
displaying the digital image in accordance with the encoded attribute, wherein the at least two possible cases are upper case and lower case, and wherein the encoded attribute is an orientation of the digital image.

10. The method of claim 9, wherein displaying the digital image in accordance with the encoded attribute comprises rotating the digital image to compensate for the orientation of the digital image.

11. The method of claim 9, wherein the at least one letters in the extension are one of "jpg" "gif," and "tif".

12. A digital imaging device, comprising:
an imaging module to convert an optical image to a digital image, the digital image having an attribute;
a memory in which to store the digital image; and
control logic configured to associate a file name with the digital image, the file name including an extension, the extension comprising at least one letter, a case of the at least one letters being selected by the control logic to encode the attribute, wherein
the case of each of the at least one letters is one of upper case and lower case, and wherein
the attribute is an orientation of the digital image.

13. The digital imaging device of claim 12, further comprising an orientation detection subsystem to detect the orientation of the digital image when the optical image is converted to the digital image.

14. The digital imaging device of claim 12, wherein the digital imaging device is one of a digital camera, a digital camcorder, and a PDA.

15. A digital imaging device, comprising:
means for converting an optical image to a digital image;
means for storing the digital image; and
means for associating a file name with the digital image, the file name including an extension, the extension comprising at least one letter and for selecting a case of the at least one letters so as to encode an attribute of the digital image, wherein
the case of each of the at least one letters in the extension is one of upper case and lower case, and wherein
the encoded attribute is an orientation of the digital image.

16. A system programmed to perform the following method:
reading a file name associated with a digital image, the file name including an extension, the extension comprising at least one letter, each of the at least one letters being represented in one of at least two possible cases;
interpreting the case of the at least one letters as an encoded attribute of the digital image; and
displaying the digital image in accordance with the encoded attribute, wherein
the at least two possible cases are upper case and lower case, and wherein the encoded attribute is an orientation of the digital image.

17. The system of claim 16, wherein displaying the digital image in accordance with the encoded attribute comprises rotating the digital image to compensate for the orientation of the digital image.

18. A computer-readable storage medium containing program code to display a digital image, comprising:
a first code segment that reads a file name associated with a digital image the file name including an extension, the extension comprising at least one letter, each of the at least one letters being represented in one of at least two possible cases;
a second code segment that interprets the case of the at least one letters as an encoded attribute of the digital image; and
a third code segment that causes the digital image to be displayed in accordance with the encoded attribute, wherein
the at least two possible cases are upper case and lower case, and wherein
the encoded attribute is the orientation of the digital image.

19. The computer-readable storage medium of claim 18, wherein the third code segment, to compensate for an orientation of the digital image, rotates the digital image.

* * * * *

UNITED STATES PATENT AND TRADEMARK OFFICE
CERTIFICATE OF CORRECTION

PATENT NO. : 7,221,811 B2  
APPLICATION NO. : 10/677194  
DATED : May 22, 2007  
INVENTOR(S) : Daniel N Debrito It is certified that error appears in the above-identified patent and that said Letters Patent is hereby corrected as shown below:

In column 5, line 13, in Claim 1, after "using the" delete "a".

In column 5, line 43, in Claim 7, delete "end" and insert -- and --, therefor.

In column 5, line 63, in Claim 11, delete "jpg" and insert -- jpg, --, therefor.

In column 6, line 48, in Claim 18, delete "image" and insert -- image, --, therefor.

Signed and Sealed this

Twelfth Day of May, 2009

JOHN DOLL  
*Acting Director of the United States Patent and Trademark Office*